United States Patent
Lachmansingh et al.

(10) Patent No.: US 7,473,093 B1
(45) Date of Patent: Jan. 6, 2009

(54) MOLDED ARTICLE PICKER

(75) Inventors: David Alaric Lachmansingh, Orangeville (CA); Derek Robertson McCready, Mississauga (CA)

(73) Assignee: Husky Injection Molding Systems Ltd., Bolton, ON (CA)

( * ) Notice: Subject to any disclaimer, the term of this patent is extended or adjusted under 35 U.S.C. 154(b) by 0 days.

(21) Appl. No.: 11/864,277

(22) Filed: Sep. 28, 2007

(51) Int. Cl.
*B66C 1/02* (2006.01)

(52) U.S. Cl. .................. 425/534; 425/437; 264/571

(58) Field of Classification Search .......... 425/185, 425/444, 445, 437, 534, DIG. 60; 414/793, 414/797; 264/232, 335, 542, 538, 571
See application file for complete search history.

(56) References Cited

U.S. PATENT DOCUMENTS

| | | | |
|---|---|---|---|
| 4,589,648 A * | 5/1986 | Hancock | 271/106 |
| 4,625,953 A * | 12/1986 | Hamatani | 271/1 |
| 4,640,503 A * | 2/1987 | Naumann | 271/103 |
| 4,729,732 A | 3/1988 | Schad et al. | |
| 4,763,778 A * | 8/1988 | Feddersen et al. | 198/867.08 |
| 4,890,726 A * | 1/1990 | Wissmann | 198/803.12 |
| 4,919,587 A * | 4/1990 | Tashiro et al. | 414/795.8 |
| RE33,237 E | 6/1990 | Delfer | |
| 5,447,426 A | 9/1995 | Gessner et al. | |
| 5,688,008 A * | 11/1997 | Hansch | 294/64.1 |
| 6,171,541 B1 | 1/2001 | Neter et al. | |
| 6,247,891 B1 * | 6/2001 | Lind | 414/811 |
| 6,769,895 B2 * | 8/2004 | Derouault et al. | 425/145 |
| 6,886,827 B2 * | 5/2005 | Dachtler | 271/106 |
| 6,951,452 B2 * | 10/2005 | Unterlander et al. | 425/145 |
| 6,971,838 B2 * | 12/2005 | Johnson et al. | 414/796.7 |
| 7,083,407 B2 * | 8/2006 | Seki et al. | 425/534 |
| 7,104,780 B2 | 9/2006 | Domodossola et al. | |
| 2004/0121038 A1 * | 6/2004 | Seki et al. | 425/529 |
| 2004/0258791 A1 * | 12/2004 | Neter et al. | 425/546 |
| 2006/0204605 A1 * | 9/2006 | Neter et al. | 425/526 |

FOREIGN PATENT DOCUMENTS

EP 1123189 B1 6/2003

\* cited by examiner

*Primary Examiner*—Yogendra Gupta
*Assistant Examiner*—Emmanuel S Luk (57) ABSTRACT

A molded article picker for use in a treatment device in a molding system, the molded article picker including an orienting seal mount associated with a seal member that permits the seal member to re-orient as required to seal with a molded article.

18 Claims, 9 Drawing Sheets

MOLDED ARTICLE PICKER

FIELD OF THE INVENTION

The present invention generally relates to, but is not limited to, molding systems, and more specifically the present invention relates to, but is not limited to, a molded article picker having a re-orientable seal member.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethelene terephthalate (PET) material is a preform that is capable of being subsequently blown into a beverage container, such as, a bottle and the like.

As an illustration, injection molding of PET material involves heating the PET material (ex. PET pellets, PEN powder, PLA, etc.) to a homogeneous molten state and injecting, under pressure, the so-melted PET material into a molding cavity defined, at least in part, by a female cavity piece and a male core piece mounted respectively on a cavity plate and a core plate of the mold. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Accordingly, by urging the core plate away from the cavity plate, the molded article can be demolded, i.e. ejected off of the core piece. Ejection structures are known to assist in removing the molded articles from the core halves. Examples of the ejection structures include stripper plates, ejector pins, etc.

One consideration for economical operation of the molding system is cycle time or, in other words, time that elapses between a point in time when the cavity and core halves are closed and the molded articles are formed and a subsequent point in time when they are opened and the molded articles are removed. As one will appreciate, the shorter the cycle time, the higher the number of molded articles that can be produced in a particular mold in a given time. One attempt to minimize the cycle time is a so-called "post-mold cooling" process. Generally speaking, the post-mold cooling process involves removing the molded articles from the mold once they are sufficiently cooled to enable ejection of the molded articles without causing significant deformation to the molded articles during its transfer to a post-mold cooling apparatus. Post mold cooling then occurs independently (but in parallel) to the injection cycle of the molding machine.

An example of the post-mold cooling apparatus is disclosed in a commonly owned U.S. Pat. No. 7,104,780 issued to Domodossola et al. on Sep. 12, 2006. More specifically, Domodossola et al. discloses a post-mold cooling apparatus for handling and cooling molded articles in an injection molding machine having a fixed platen, a movable platen, a core half, and a cavity half. The post-mold cooling apparatus includes a take-off device coupled to the fixed platen is configured to receive molded articles from either the core half or the cavity half. The post-mold cooling apparatus also includes a treatment device coupled to the movable platen that is configured to cool and extract the molded articles carried by the take-off device. In operation, the take-off device moves linearly inboard of the mold halves to position a first set of molded article carriers on the take-off device to receive hot molded articles from the mold's core half, once the hot molded articles have been received in the first set of molded article carriers the take-off device moves linearly outboard of the mold halves. The subsequent movement of the movable platen to close the mold in the next molding cycle causes a first set of treatment pins on the treatment device to engage the hot molded articles in the first set of molded article carriers of the take-off device, a second set of treatment pins on the treatment device to engage partially cooled molded articles previously received in a second set of molded article carriers on the take-off device, and a set of molded article pickers on the treatment device to engage cooled molded articles previously received on a third set of molded article carriers on the take-off device. When the movable platen opens again, the cooled molded articles are extracted from the third set of molded article carriers by the set of molded article pickers. When the movable platen is fully open, the treatment device is rotated to a drop position and the cooled molded articles are released from the molded article pickers and onto a conveyor or into some other post-mold device. When the molded articles have been released from the molded article pickers the treatment device is rotated back to a pick position and the cycle repeats.

Figure 2:
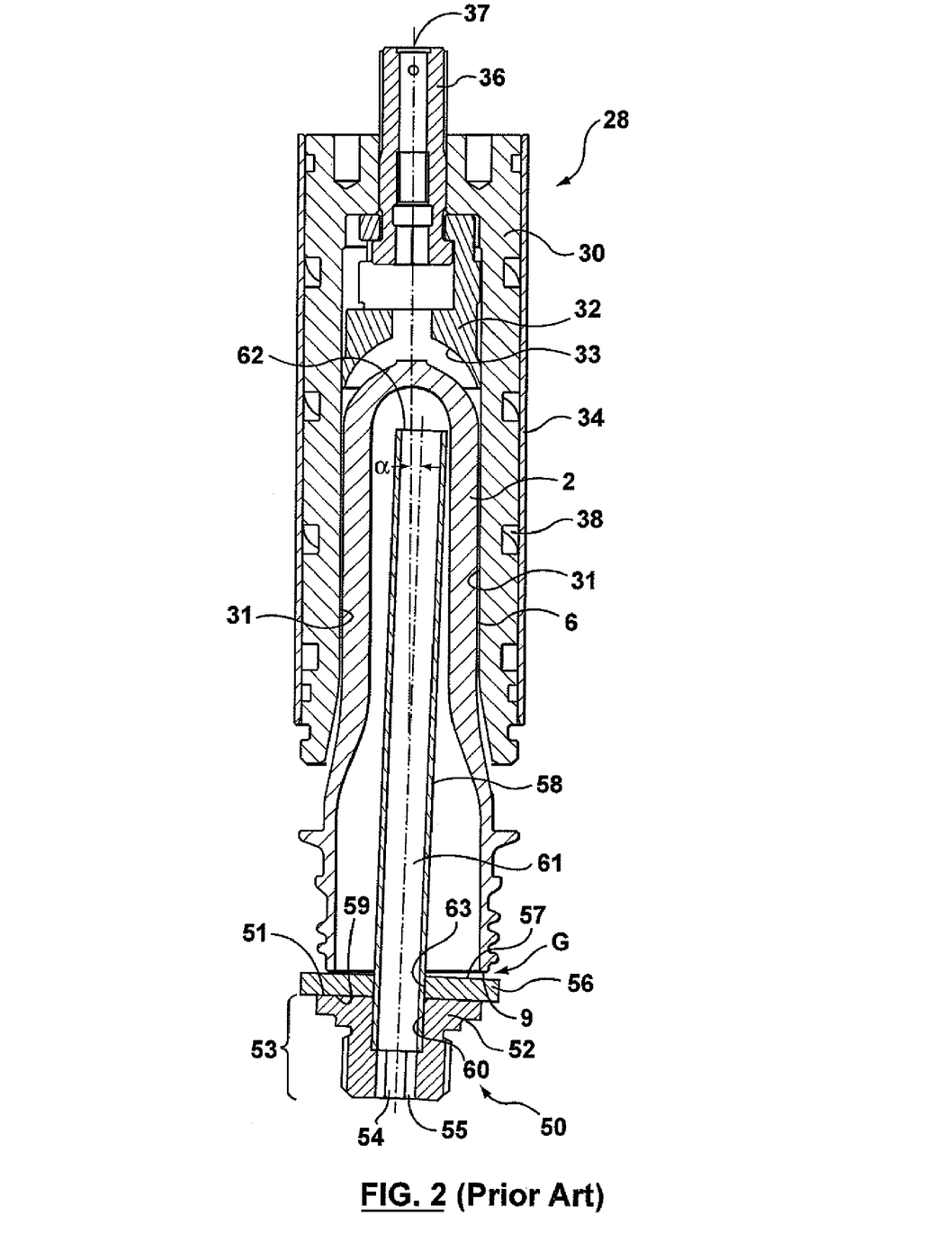
FIG. 2 depicts a section view through a typical molded article picker receiving a molded article from a typical molded article carrier.

With reference to FIG. 2, a typical molded article carrier 28 for use with the foregoing take-off device is shown. The molded article carrier 28 includes a cooling tube 30, an insert 32, a sleeve 34, and a fastener 36. The cooling tube 30 and the insert 32 define an inner surface 31 and 33, respectively, that together define a cavity for receiving a molded article 2. A coolant channel 38 is defined between a groove formed through the outer surface of the cooling tube 30 and an inner surface of the sleeve 34 which surrounds the cooling tube 30. In operation, a coolant is circulated in the coolant channel to cool the molded article 2 arranged in the molded article carrier 28. The fastener 36 is configured to connect the cooling tube 30 to a carrier plate (not shown) of a take-off device (not shown). The fastener 36 also defines an axial channel 37 therethrough for connecting the cavity of the molded article carrier 28 to a first air pressure regulator (not shown). In operation, the first air pressure regulator (not shown) is controllably operated to provide a suction air flow from the cavity to receive the molded article 2 therein, or the first air pressure regulator (not shown) is controllably operated to provide an air flow into the cavity to eject the molded article 2 therefrom.

With reference to FIG. 2, a typical molded article picker for use in the foregoing treatment device as a molded article picker 50 is shown. The molded article picker 50 includes a base member 52, a seal member 56, and a tubular pin 58. A base portion of the tubular pin 58 is received in a seat 60 defined in the base member 52 such that the remaining portion of the tubular pin 58 extends from a top surface 51 of the base member 52. A first pressure channel 54 is formed through the base member 52 beneath the seat 60. The first pressure channel 54 connects a second pressure channel 61 that extends through the tubular pin 58 to a second air pressure regulator (not shown). In operation, the second air pressure regulator (not shown) is controllably operated to provide a suction air flow from the region surrounding the tubular pin 58 through a top opening 62 of the second pressure channel 61. The seal member 56 has an annular body. An inner surface 63 of seal member 56 fits tightly around the tubular pin 58 to maintain the seal member 56 in a substantially fixed position with a bottom surface 59 thereof in contact with the top surface 51 of the base member 52.

As will be appreciated by those of skill in the art, a small inaccuracy in the angular positioning of the molded article picker 50 into the pick position can lead to difficulty in reliable picking of the molded articles from the molded article carriers of the take-off device. For example, with reference to FIG. 2 it can be seen that with as little as a 2 degree angular misalignment between the molded article picker 50 and the molded article carrier 28, reference angle α between the centerlines of the molded article carrier 28 and the molded article picker 50, that it is not possible to close a gap G along one side of the top surface 9 of the molded article 2 and the sealing surface 57 of the seal member 56 and hence form a completely enclosed volume between the molded article 2, the tubular pin 58, and the seal member 56 that is the required to effect a reliable vacuum assisted transfer of the molded article 2 from the molded article carrier 28 to the molded article picker 50. The molded article 2 in this example is a preform of the type that is blow molded into a bottle.

One of the problems associated with this prior art approach is that the molded article picker 50 may fail to remove the molded article 2 from the molded article carrier 28 and hence the molded article carrier 28 isn't available to fetch the next hot molded article 2 from the mold forcing the machine operator to disable production and to manually remove the untransferred molded article 2 before resuming production.

SUMMARY OF THE INVENTION

According to a first broad aspect of the present invention, there is provided a molded article picker for use in a treatment device in a molding system, the molded article picker comprising an orienting seal mount associated with a seal member that permits the seal member to re-orient as required to seal with a molded article.

DESCRIPTION OF THE DRAWINGS

A better understanding of the embodiments of the present invention (including alternatives and/or variations thereof) may be obtained with reference to the detailed description of the exemplary embodiments along with the following drawings, in which.

The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF EMBODIMENTS

Figure 1:
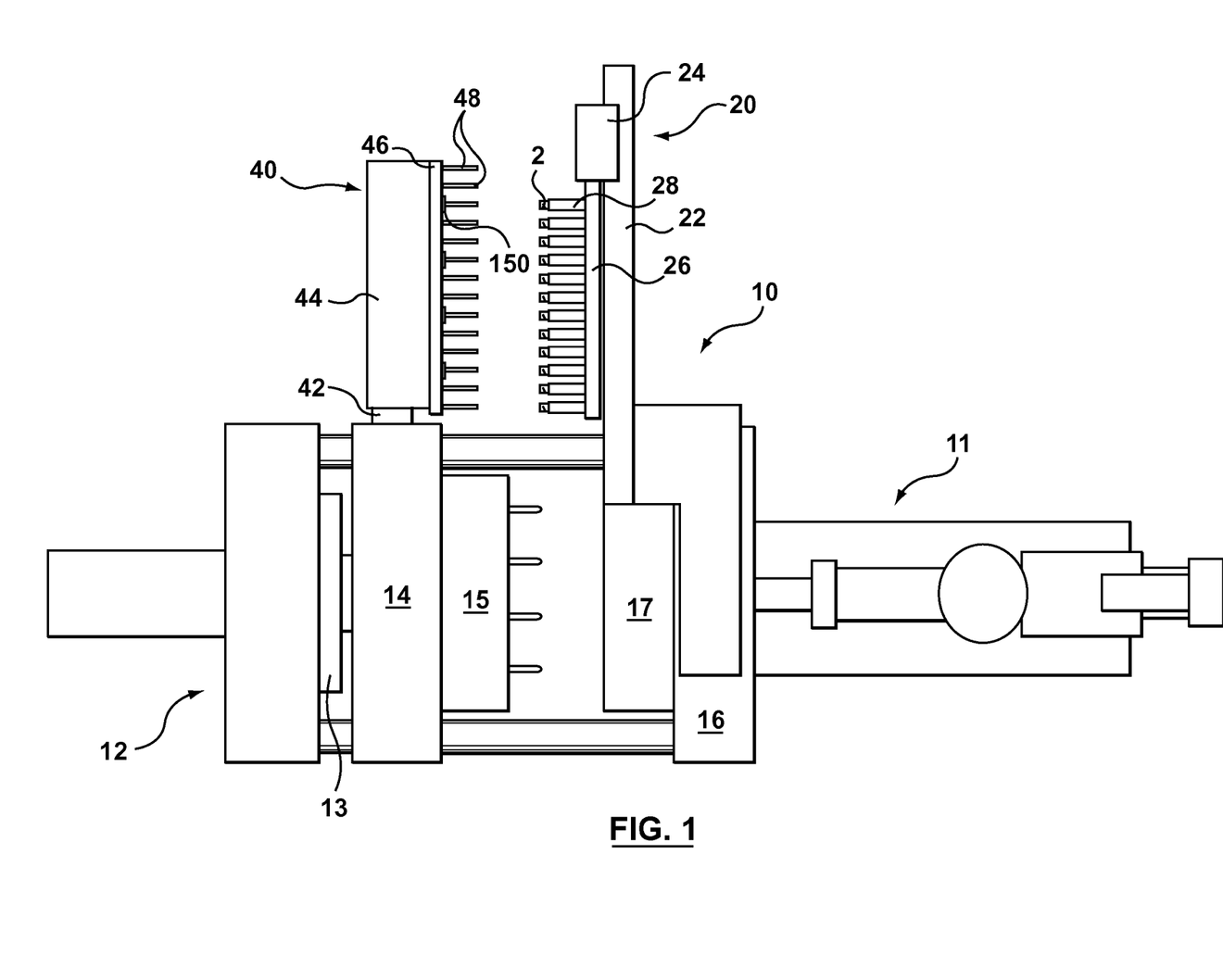
FIG. 1 is a schematic representation of a molding system in accordance with a non-limiting embodiment of the present invention.

With reference to FIG. 1, there is depicted a non-limiting embodiment of a molding system 10 which can be adapted to implement embodiments of the present invention. For illustration purposes only, it shall be assumed that the molding system 10 comprises an injection molding system for processing molding material, such as, PET for example. However, it should be understood that in alternative non-limiting embodiments, the molding system 10 may comprise other types of molding systems, such as, but not limited to, compression molding systems, metal molding systems and the like. It should be further understood that embodiments of the present invention are applicable to the molding system 10 incorporating any multicavitation mold, including PET molds, thinwall articles molds, closures molds and the like.

Within the non-limiting embodiment of FIG. 1, the molding system 10 comprises a clamp 12 with a fixed platen 16 and a movable platen 14. The molding system 10 further comprises an injection unit 11 for plasticizing and injection of molding material. In operation, the movable platen 14 is moved towards and away from the fixed platen 16 by means of stroke cylinders (not shown) or any other suitable means. Clamp force (also referred to as closure or mold closure tonnage) can be developed within the molding system 10, for example, by using and a clamping mechanism 13.

A first mold half 17 can be associated with the fixed platen 16 and a second mold half 15 can be associated with the movable platen 14. In the specific non-limiting embodiment of FIG. 1, the first mold half 17 comprises one or more mold cavities (not shown). As will be appreciated by those of skill in the art, the one or more mold cavities may be formed by using suitable mold inserts or any other suitable means. As such, the first mold half 17 can be generally thought of as a "mold cavity half". The second mold half 15 comprises one or more mold complementary to the one or more mold cavities. As will be appreciated by those of skill in the art, the one or more mold cores may be formed by using suitable mold inserts or any other suitable means. As such, the second mold half can be generally thought of as a "mold core half".

FIG. 1 depicts the first mold half 17 and the second mold half 15 in a so-called "mold open position" where the movable platen 14 is positioned generally away from the fixed platen 16 and, accordingly, the first mold half 17 is positioned generally away from the second mold half 15. For example, in the mold open position, a molded article (not depicted) can be removed from the first mold half 17 and/or the second mold half 15. In a so-called "mold closed position" (not depicted), the first mold half 17 and the second mold half 15 are urged together (by means of movement of the movable platen 14 towards the fixed platen 16) and cooperate to define (at least in part) a molding cavity (not depicted) into which the molten plastic (or other suitable molding material) can be injected, as is known to those of skill in the art.

The molding system 10 can further comprise a take-off device 20 operatively coupled to the fixed platen 16. Those skilled in the art will readily appreciate how the take-off device 20 can be operatively coupled to the fixed platen 16 and, as such, it will not be described here in any detail. The take-off device 20 includes a beam 22, a tooling mount 24, a drive (not shown), and a tooling plate 26 with several sets of molded article carriers 28 mounted thereto. The beam 22 is fastened to the stationary platen 16 and cantilevers away therefrom. The tooling mount 24 is slidably connected to the beam 22. The drive (not shown) is operatively connected to the tooling mount 24 for movement thereof along the beam 22. The take-off plate 26 is coupled to the tooling mount 24 for movement therewith and in this way position the molded article carriers 28 between an inboard position for receiving the molded articles 2 from the second mold half 15, and an outboard position such that the molded articles 2 there are placed in a position for interaction with a treatment device 40. Generally speaking, the purpose of the plurality of molded article carriers 28 is to remove molded articles 2 from the one or more mold cores (or the one or more mold cavities) and/or to implement post mold cooling of the molded articles. In the specific non-limiting example being illustrated herein, the plurality of molded article carriers 28 comprises a plurality of cooling tubes for receiving a plurality of molded preforms. However, it should be expressly understood that the plurality of molded article carriers 28 may have other configurations. The exact number of the plurality of molded article carriers 28 is not particularly limited. For example, if a three-position post mold cooling cycle is to be implemented and if the molding system 10 comprises 72 instances of the one or more mold cavities (for example, 12 rows of 6), the take-off plate 26 can comprise 216 instances of the plurality of molded article carriers 28 (i.e. twelve rows of 18). Other configurations are, of course, also possible and are limited by business considerations of an entity managing the molding system 10.

The molding system 10 further comprises a treatment device 40 operatively coupled to the movable platen 14. Those skilled in the art will readily appreciate how the treatment device 40 can be operatively coupled to the movable platen 14 and, as such, it will not be described here in any detail. The treatment device 40 comprises a mounting structure 42 used for coupling the treatment device 40 to the movable platen 14. The treatment device 40 further comprises a plenum 44 coupled to the mounting structure 42. Coupled to the plenum 44 is a tooling plate 46 upon which sets of treatment pins 48 and a set of molded article pickers 150 are mounted. Generally speaking, the purpose of the plenum 44 is to supply pressurized air to the sets of treatment pins 48. The purpose of the plurality of treatment pins 48 is to provide air to cool the molded articles from within. The purpose of the molded article pickers 150 is to remove the molded articles 2 from the plurality of molded article carriers 28 and to later eject the molded articles onto a conveyor (not shown) or onto any other post-mold device. The mounting structure 42 further includes a rotating mechanism (not shown) that rotates the plenum 44 and with it the tooling plate 46, treatment pins 48 and the molded article pickers 150 relative to the movable platen 14 between a pick position (as shown), and a drop position (not shown). In the drop position the tooling plate 46 is oriented to face the conveyor or the other post-mold device arranged therebeneath such that the molded articles 2 may be transferred thereto once released from the molded article picker 150.

Naturally, the molding system 10 may comprise a number of additional components, such as a hot runner (not depicted) associated, for example, with the fixed platen 16. Furthermore, the molding system 10 may optionally or additionally comprise auxiliary equipment (not depicted), such as dehumidifiers, heaters and the like. All this equipment is known to those of skill in the art and, as such, will not be discussed at any length here. It should be expressly understood that the molding system 10 may have other configurations and the description presented above has been provided as an example only and is not intended to be limiting in any form. In other non-limiting embodiments of the present invention, the molding system 10 can have other configurations with more or fewer components.

Figure 3A:
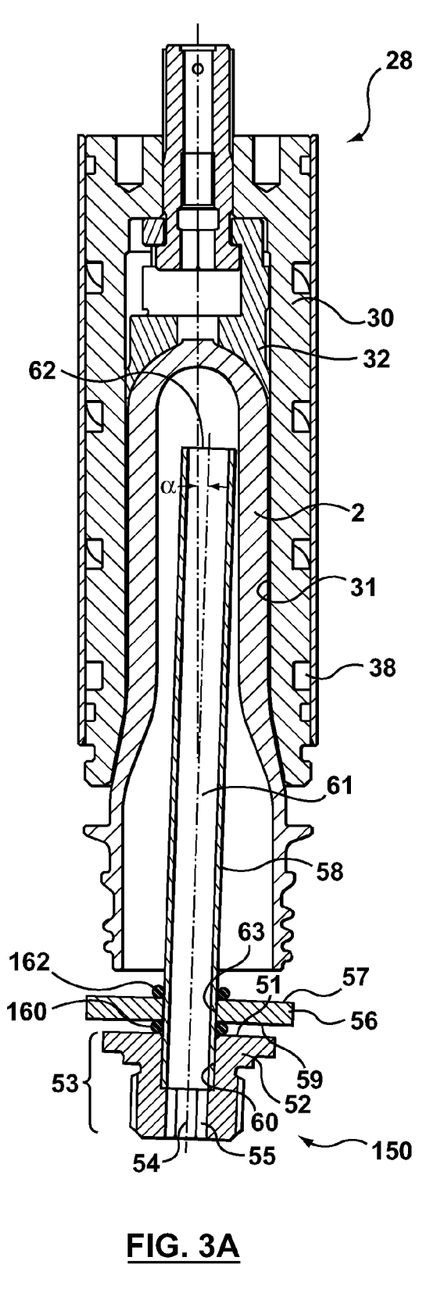
FIG. 3A depicts a section view through a molded article picker in accordance with an non-limiting embodiment of the present invention just prior to engaging a molded article in a typical molded article carrier.
Figure 3B:
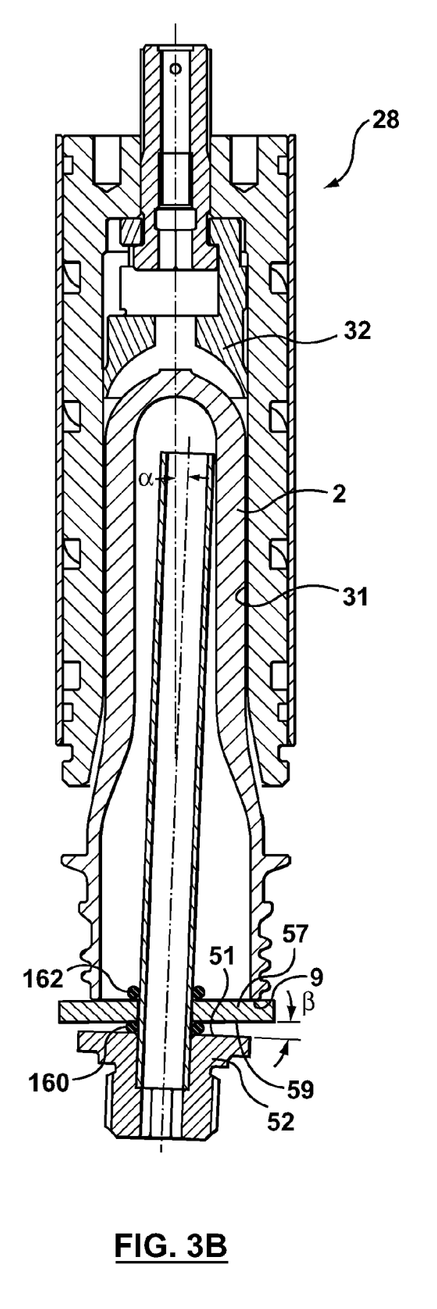
FIG. 3B depicts a section view through a molded article picker in accordance with an non-limiting embodiment of the present invention that has engaged a molded article and is in the midst of removing the molded article from a typical molded article carrier.

With reference to FIGS. 3A and 3B, the molded article picker 150 in accordance with a non-limiting embodiment of the present invention is shown immediately before receiving and after having received, respectively, a molded article 2, in this case a preform of the type for blow molding into a bottle, from the molded article carrier 28. The molded article picker 150 includes the same base member 52, seal member 56, and tubular pin 58 as the typical molded article picker 50 described previously with reference to FIG. 2. Accordingly, the base portion of the tubular pin 58 is received in the seat 60 defined in the base member 52 such that the remaining portion of the tubular pin 58 extends from a top surface 51 of the base member 52. The first pressure channel 54 is formed through the base member 52 beneath the seat 60. The first pressure channel 54 connects the second pressure channel 61 that extends through the tubular pin 58 to the second air pressure regulator (not shown) via a pressure channel (not shown) formed in the tooling 46 of the treatment device 40. In operation, the second air pressure regulator (not shown) is controllably operated to provide the suction air flow from the region surrounding the tubular pin 58 through the top opening 62 of the second pressure channel 61. The base member 52 further includes a mounting interface 53 that is configured to cooperate with a complementary mounting interface (not shown) configured in the tooling plate 46 (FIG. 1) for releasably securing the molded article picker 150 thereto. To assist with engaging or disengaging the mounting interface 53 of the base member 52 with the complementary mounting interface (not shown) of the tooling plate 46 (FIG. 1), a tooling interface 55, such as for a hexagonal shaped key, is formed in the surface of the first pressure channel 54. The features of the mounting interface 53 may include a threaded portion and an alignment portion. The seal member 56 has an annular body. The seal member 56 may be made from a flexible material such as, for example, silicone rubber or a relatively rigid material such as, for example, an Acetal-based polymeric compound such as DELRIN (Trademark E.I. du Pont de Nemours & Co) or ultra high molecular weight polyethylene. The molded article picker 150 further includes an orienting seal mount 160 associated with the seal member 56 that permits the seal member 56 to re-orient as required to seal with the molded article 2. The orienting seal mount 160 is disposed between the bottom surface 59 of the seal member 56 and the top surface 51 of the base member 52. The inner surface 63 of seal member 56 may be configured to fit loosely or tightly around the tubular pin 58. A seal retainer 162 is provided to maintain the seal member 56 in a substantially fixed longitudinal position (which may include a small amount of float), relative to the longitudinal axis of the tubular pin 58, with the bottom surface 59 of the seal member 56 in contact with the top surface of the orienting seal mount 160. In the non-limiting embodiment of the present invention, both the orienting seal mount 160 and the seal retainer 162 are o-rings. The o-rings are selected such that they have an inner diameter that fits closely around the tubular pin 58. The o-ring that makes up the seal retainer 162 should fit tightly around the tubular pin 58 to maintain the seal member 56 in contact with the o-ring that provides the orienting seal mount 160. Likewise, the o-ring that makes up the seal retainer 162 should overlap a minor portion of the sealing surface 57 of the seal member 56 to maintain contact therewith. The o-ring that provides the orienting seal mount 160 should be selected to overlap a minor portion of the bottom surface 59 of the seal member 56 and a minor portion of the top surface of the base member 52. When the seal retainer 162 and the orienting seal mount 160 are positioned on the tubular pin 58 to tightly capture the seal member 56 therebetween, one or more of the seal member 56, the o-ring providing the seal retainer 162, or the o-ring providing the orienting seal mount 160 may be made of an elastomeric-type material to give enough compliance in the system for the seal member 62 to re-orient, as required, to align the sealing surface 57 thereof with the top surface 9 of the molded article. Alternatively, in another non-limiting embodiment the seal retainer 162 and the orienting seal mount 160 may be positioned on the tubular pin 58 to loosely capture the seal member 52 therebetween, wherein the seal member 56 having an inner surface 63 that is configured to loosely fit around the tubular pin 58 is freely re-orientable to align the sealing surface 57 thereof with the top surface 9 of the molded article. The foregoing non-limiting embodiment does not required that any one of the seal member 56, the seal retainer 162, or the orienting seal mount 160 be made of an elastomeric-type material. Following the foregoing selection criteria, a person of ordinary skill in the art will be able to select the seal retainer 162 and the orienting seal mount 160 whereby the seal member 162 is re-orientable relative to the longitdunial axis of the tubular pin 58.

Figure 4A:
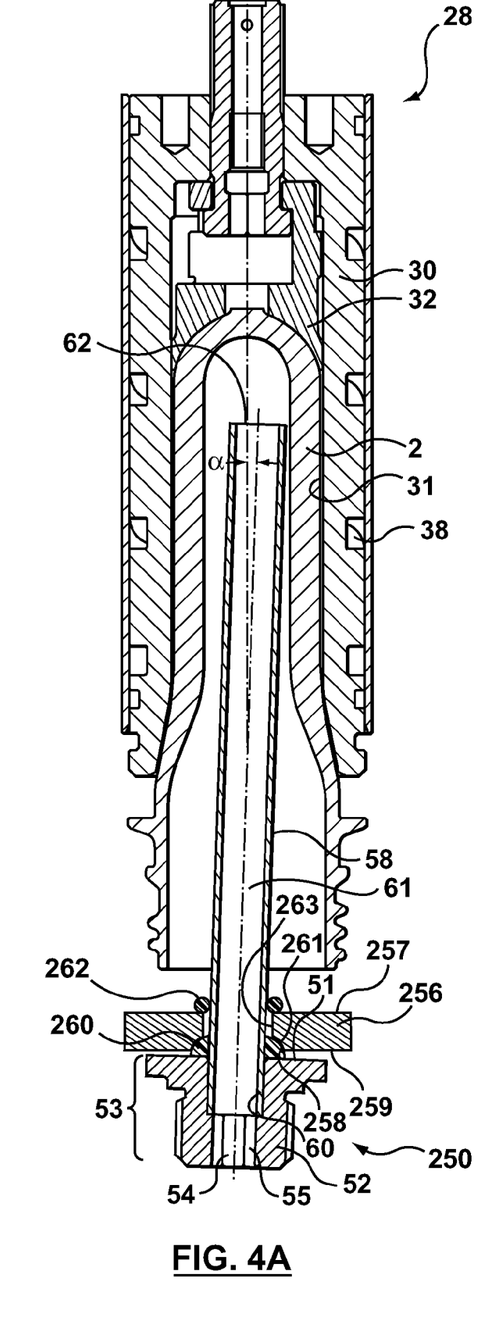
FIG. 4A depicts a section view through a molded article picker in accordance with another non-limiting embodiment of the present invention just prior to engaging a molded article in a typical molded article carrier.
Figure 4B:
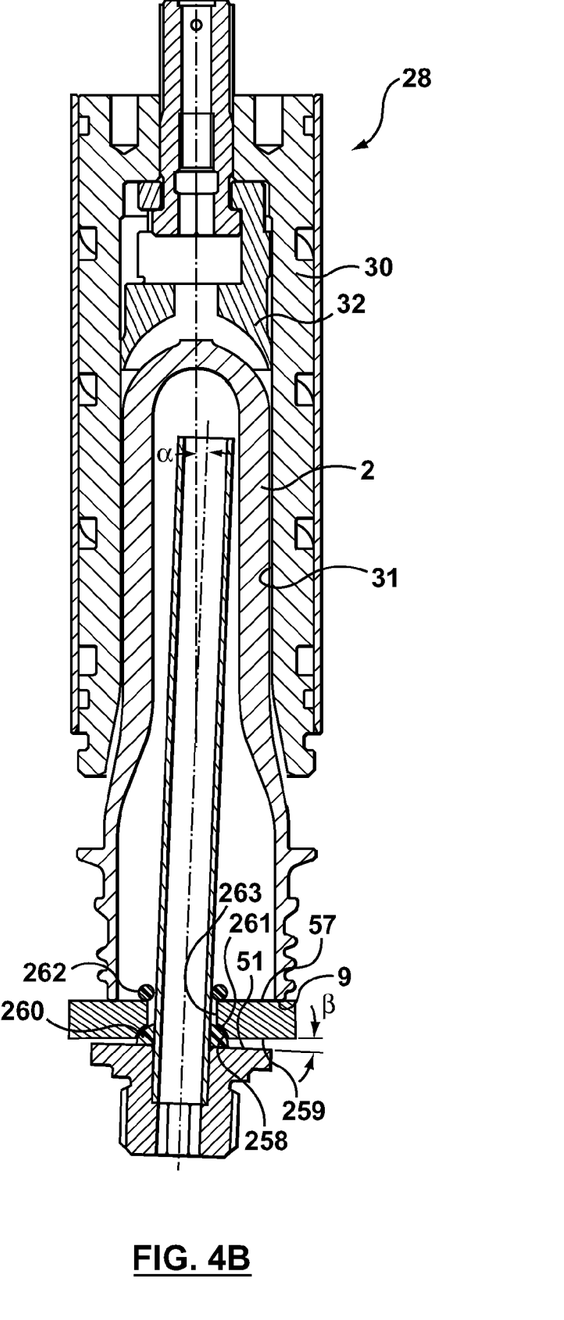
FIG. 4B depicts a section view through a molded article picker in accordance with another non-limiting embodiment of the present invention that has engaged a molded article and is in the midst of removing the molded article from a typical molded article carrier.

With reference to FIGS. 4A and 4B, a molded article picker 250 in accordance with a further non-limiting embodiment of the present invention is shown immediately before receiving and after having received, respectively, a molded article 2, in this case a preform of the type for blow molding into a bottle, from the molded article carrier 28. The molded article picker 250 includes the same base member 52, and tubular pin 58 as the typical molded article picker 50 described previously with reference to FIG. 2. Accordingly, the base portion of the tubular pin 58 is received in the seat 60 defined in the base member 52 such that the remaining portion of the tubular pin 58 extends from a top surface 51 of the base member 52. The first pressure channel 54 is formed through the base member 52 beneath the seat 60. The first pressure channel 54 connects the second pressure channel 61 that extends through the tubular pin 58 to the second air pressure regulator (not shown) via a pressure channel (not shown) formed in the tooling 46 of the treatment device 40 (FIG. 1). In operation, the second air pressure regulator (not shown) is controllably operated to provide the suction air flow from the region surrounding the tubular pin 58 through the top opening 62 of the second pressure channel 61. The base member 52 further includes a mounting interface 53 that is configured to cooperate with a complementary mounting interface (not shown) configured in the tooling plate 46 (FIG. 1) for releasably securing the molded article picker 250 thereto. To assist with engaging or disengaging the mounting interface 53 of the base member 52 with the complementary mounting interface (not shown) of the tooling plate 46 (FIG. 1), a tooling interface 55, such as for a hexagonal shaped key, is formed in the surface of the first pressure channel 54. The features of the mounting interface 53 may include a threaded portion and an alignment portion. The molded article picker 250 also includes a seal member 256 that has an annular body. The seal member 256 may be made from a flexible material such as, for example, silicone rubber or a relatively rigid material such as, for example, an Acetal-based polymeric compound such as DELRIN or ultra high molecular weight polyethylene. The molded article picker 250 further includes an orienting seal mount 260 associated with the seal member 256 that permits the seal member 256 to re-orient as required to seal with the molded article 2. The orienting seal mount 260 is disposed between a bottom surface 259 of the seal member 256 and the top surface 51 of the base member 52. More particularly, the orienting seal mount 260 includes a spherical upper surface that provides a ball interface 261, and the seal member 256 includes a spherical recess that provides a socket interface 258, the ball interface 261 and the socket interface 258 being cooperable as a ball joint that allows for a re-orientation of the seal member 256. The inner surface 263 of seal member 256 may be configured to fit loosely or tightly around the outer surface tubular pin 58. In the present non-limiting embodiment the inner surface 263 there is a gap between the inner surface 263 and the outer surface of the tubular pin 58 and hence the seal member 256 will tend to stay in any given orientation until disturbed. Alternatively, if the inner surface 263 is configured to fit tightly around the tubular pin 58 the seal member 256 would be made from a flexible material to allow for elastic deformation of the seal member 256 as it is re-oriented about the ball joint with an applied pressure from the molded article 2. A seal retainer 262 is provided to maintain the seal member 256 in a substantially fixed longitudinal position (which may include a small amount of float), relative to the longitudinal axis of the tubular pin 58, with the socket interface 258 of the seal member 56 in contact with the ball interface 261 of the orienting seal mount 260. In the non-limiting embodiment of the present invention, the seal retainer 262 is a o-ring. The o-ring that makes up the seal retainer 262 should overlap a minor portion of the sealing surface 257 of the seal member 256 to maintain contact therewith. The orienting seal mount 260 may be made from a rigid material such as, for example, an Acetal-based polymeric compound such as DELRIN or ultra high molecular weight polyethylene.

Figure 5:
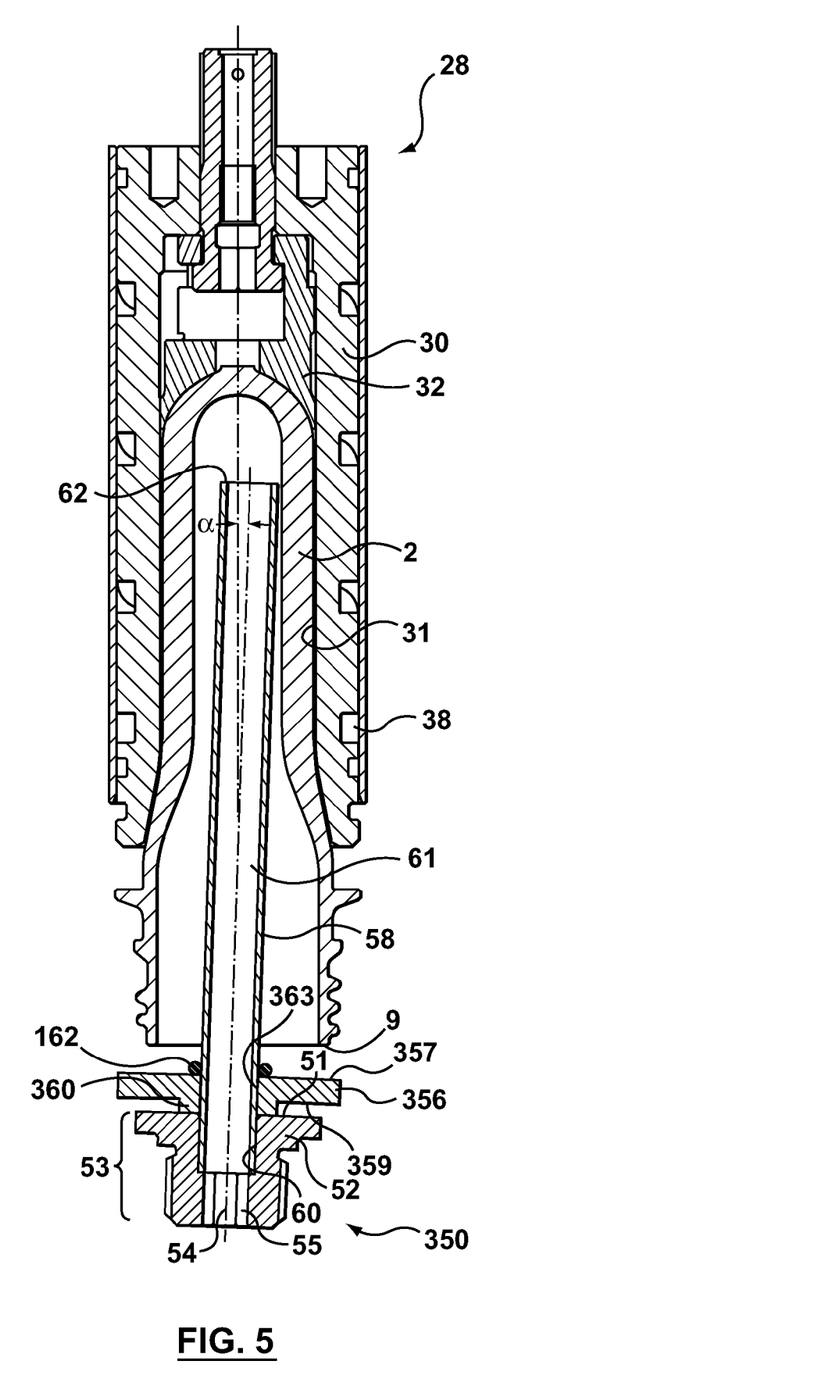
FIG. 5 depicts a section view through a molded article picker in accordance with another non-limiting embodiment of the present invention just prior to engaging a molded article in a typical molded article carrier.

With reference to FIG. 5, a molded article picker 350 in accordance with a further non-limiting embodiment of the present invention is shown. The molded article picker 350 includes the same base member 52, and tubular pin 58 as the typical molded article picker 50 described previously with reference to FIG. 2. Accordingly, the base portion of the tubular pin 58 is received in the seat 60 defined in the base member 52 such that the remaining portion of the tubular pin 58 extends from a top surface 51 of the base member 52. The first pressure channel 54 is formed through the base member 52 beneath the seat 60. The first pressure channel 54 connects the second pressure channel 61 that extends through the tubular pin 58 to the second air pressure regulator (not shown) via a pressure channel (not shown) formed in the tooling 46 of the treatment device 40 (FIG. 1). In operation, the second air pressure regulator (not shown) is controllably operated to provide the suction air flow from the region surrounding the tubular pin 58 through the top opening 62 of the second pressure channel 61. The base member 52 further includes a mounting interface 53 that is configured to cooperate with a complementary mounting interface (not shown) configured in the tooling plate 46 (FIG. 1) for releasably securing the molded article picker 350 thereto. To assist with engaging or disengaging the mounting interface 53 of the base member 52 with the complementary mounting interface (not shown) of the tooling plate 46 (FIG. 1), a tooling interface 55, such as for a hexagonal shaped key, is formed in the surface of the first pressure channel 54. The features of the mounting interface 53 may include a threaded portion and an alignment portion. The molded article picker 350 also includes a seal member 356 that has an annular body. The seal member 356 may be made from a flexible material such as, for example, silicone rubber. The molded article picker 350 further includes an orienting seal mount 360 formed as a part of the seal member 356 that permits a peripheral portion of the seal member 356 to re-orient as required to seal with the molded article 2. More particularly, the orienting seal mount 360 is an annular projection from a bottom surface 359 of the seal member 356, the diameter of the annular projection being much narrower than the overall diameter of the seal member 356 whereby a major portion of the seal member 356 is unsupported by the orienting seal mount 360 and hence free to re-orient, by means of flexure, as required to allow a sealing surface 357 of the seal member 356 to seal with the top surface 9 of the molded article 2. The orienting seal mount 360 cooperates, in use, with the top surface 51 of the base member 52. The inner surface 363 of seal member 356 may be configured to fit loosely or tightly around the outer surface tubular pin 58. In the present non-limiting embodiment the inner surface 363 is fit closely to the outer surface of the tubular pin 58. A seal retainer 162 is provided to maintain the seal member 356 in a substantially fixed longitudinal position (which may include a small amount of float), relative to the longitudinal axis of the tubular pin 58. In the non-limiting embodiment of the present invention, the seal retainer 162 is a o-ring. The o-ring that makes up the seal retainer 162 should overlap a minor portion of the sealing surface 357 of the seal member 356 to maintain contact therewith.

Figure 6:
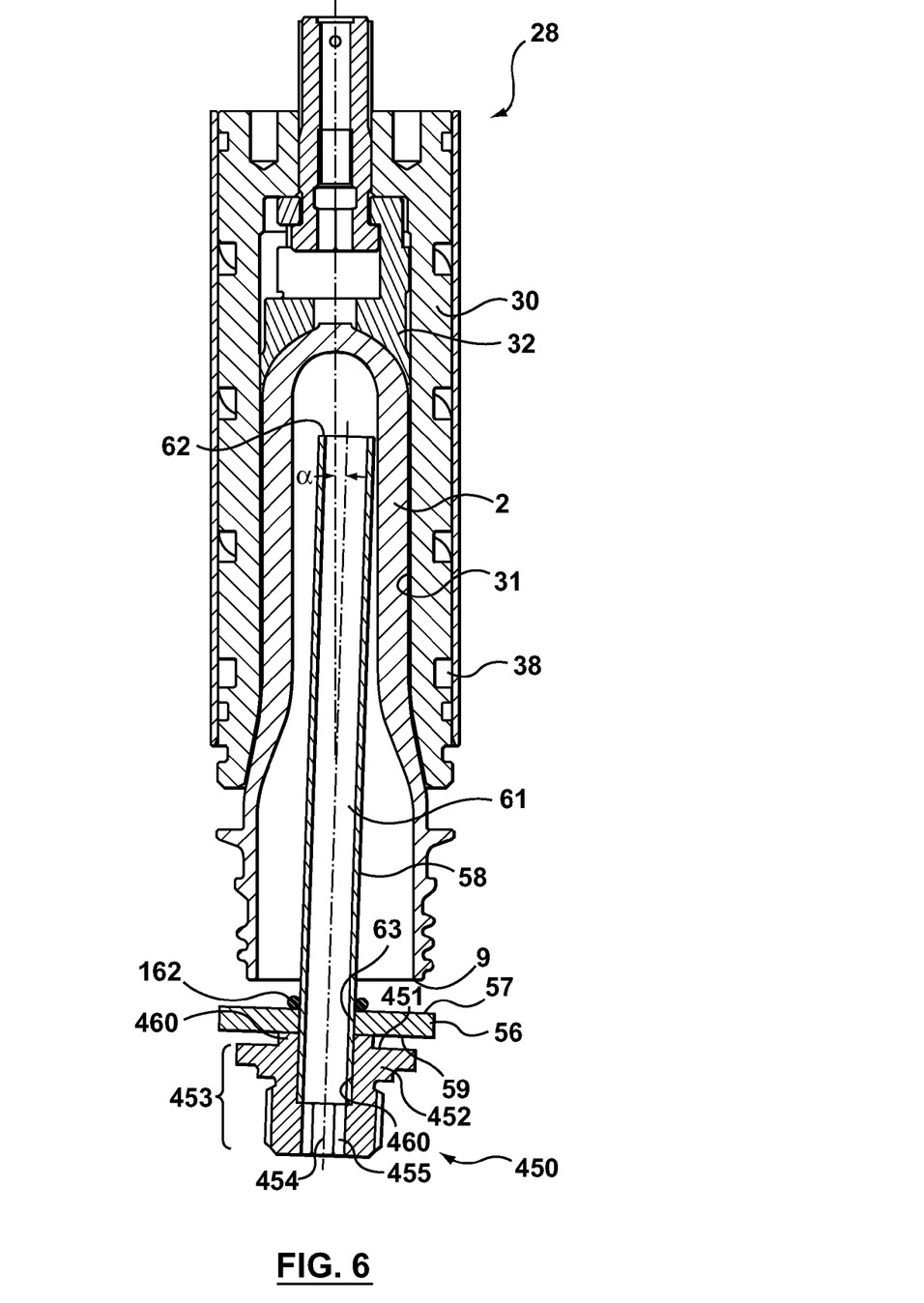
FIG. 6 depicts a section view through a molded article picker in accordance with another non-limiting embodiment of the present invention just prior to engaging a molded article in a typical molded article carrier.

With reference to FIG. 6, a molded article picker 450 in accordance with a further non-limiting embodiment of the present invention is shown. The molded article picker 450 includes the same seal member 56 and tubular pin 58 as the typical molded article picker 50 described previously with reference to FIG. 2. The base portion of the tubular pin 58 is received in a seat 460 defined in the base member 452 such that the remaining portion of the tubular pin 58 extends from a top surface 451 of the base member 452. A first pressure channel 454 is formed through the base member 452 beneath the seat 460. The first pressure channel 454 connects the second pressure channel 61 that extends through the tubular pin 58 to the second air pressure regulator (not shown) via a pressure channel (not shown) formed in the tooling 46 of the treatment device 40 (FIG. 1). In operation, the second air pressure regulator (not shown) is controllably operated to provide the suction air flow from the region surrounding the tubular pin 58 through the top opening 62 of the second pressure channel 61. The base member 452 further includes a mounting interface 453 that is configured to cooperate with a complementary mounting interface (not shown) configured in the tooling plate 46 (FIG. 1) for releasably securing the molded article picker 450 thereto. To assist with engaging or disengaging the mounting interface 453 of the base member 452 with the complementary mounting interface (not shown) of the tooling plate 46 (FIG. 1), a tooling interface 455, such as for a hexagonal shaped key, is formed in the surface of the first pressure channel 454. The features of the mounting interface 453 may include a threaded portion and an alignment portion. The seal member 56 that has an annular body. The seal member 56 may be made from a flexible material such as, for example, silicone rubber. The molded article picker 450 further includes an orienting seal mount 460 formed as a part of the base member 452 that permits a peripheral portion of the seal member 56 to re-orient as required to seal with the molded article 2. More particularly, the orienting seal mount 460 is an annular projection from a top surface 451 of the base member 452, the diameter of the annular projection being much narrower than the overall diameter of the seal member 56 whereby a major portion of the seal member 56 is unsupported by the orienting seal mount 460 and hence free to re-orient, by means of flexure, as required to allow the sealing surface 57 of the seal member 56 to seal with the top surface 9 of the molded article 2. The orienting seal mount 460 cooperates, in use, with the bottom surface 59 of the seal member 56. The inner surface 63 of seal member 56 may be configured to fit loosely or tightly around the outer surface tubular pin 58. In the present non-limiting embodiment the inner surface 63 is fit closely to the outer surface of the tubular pin 58. A seal retainer 162 is provided to maintain the seal member 56 in a substantially fixed longitudinal position (which may include a small amount of float), relative to the longitudinal axis of the tubular pin 58. In the non-limiting embodiment of the present invention, the seal retainer 162 is a o-ring. The o-ring that makes up the seal retainer 162 should overlap a minor portion of the sealing surface 57 of the seal member 56 to maintain contact therewith.

Figure 7:
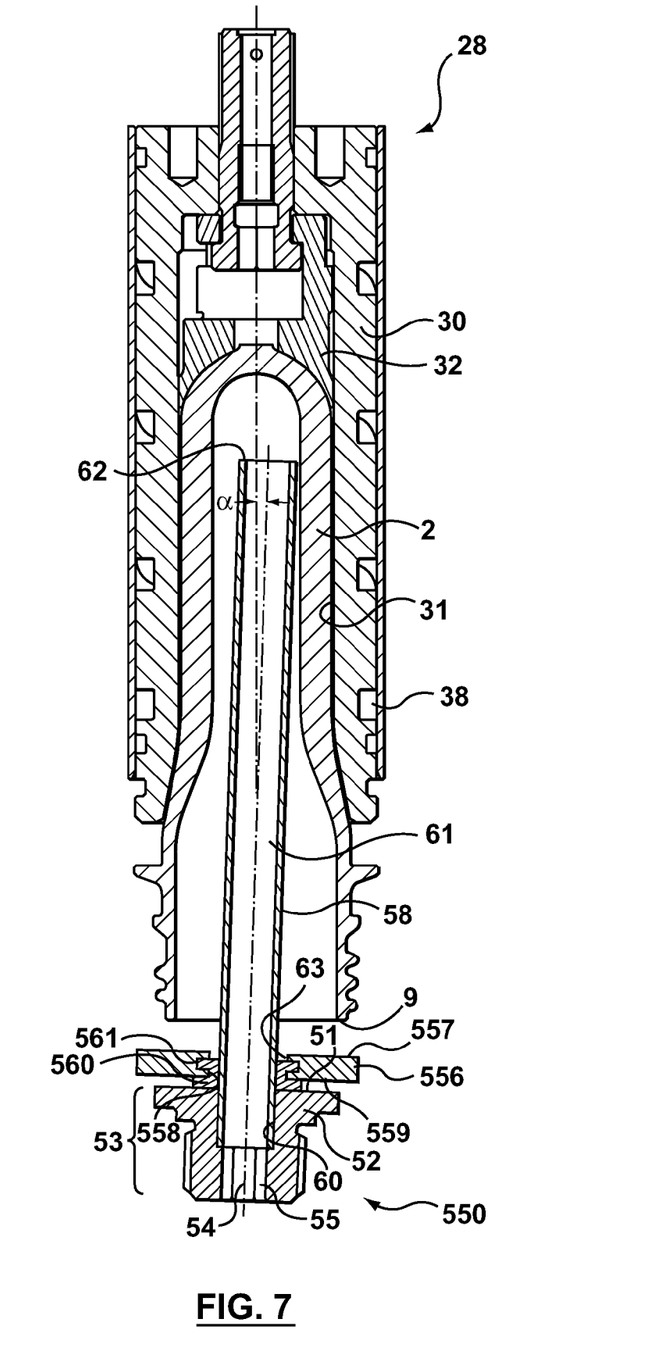
FIG. 7 depicts a section view through a molded article picker in accordance with another non-limiting embodiment of the present invention just prior to engaging a molded article in a typical molded article carrier.

With reference to FIG. 7, a molded article picker 550 in accordance with a further non-limiting embodiment of the present invention is shown. The molded article picker 550 includes the same base member 52, and tubular pin 58 as the typical molded article picker 50 described previously with reference to FIG. 2. Accordingly, the base portion of the tubular pin 58 is received in the seat 60 defined in the base member 52 such that the remaining portion of the tubular pin 58 extends from a top surface 51 of the base member 52. The first pressure channel 54 is formed through the base member 52 beneath the seat 60. The first pressure channel 54 connects the second pressure channel 61 that extends through the tubular pin 58 to the second air pressure regulator (not shown) via a pressure channel (not shown) formed in the tooling 46 of the treatment device 40 (FIG. 1). In operation, the second air pressure regulator (not shown) is controllably operated to provide the suction air flow from the region surrounding the tubular pin 58 through the top opening 62 of the second pressure channel 61. The base member 52 further includes a mounting interface 53 that is configured to cooperate with a complementary mounting interface (not shown) configured in the tooling plate 46 (FIG. 1) for releasably securing the molded article picker 550 thereto. To assist with engaging or disengaging the mounting interface 53 of the base member 52 with the complementary mounting interface (not shown) of the tooling plate 46 (FIG. 1), a tooling interface 55, such as for a hexagonal shaped key, is formed in the surface of the first pressure channel 54. The features of the mounting interface 53 may include a threaded portion and an alignment portion. The molded article picker 550 also includes a seal member 556 that has an annular body. The seal member 556 may be made from a flexible material such as, for example, silicone rubber or a relatively rigid material such as, for example, an Acetal-based polymeric compound such as DELRIN or ultra high molecular weight polyethylene. The molded article picker 550 further includes an orienting seal mount 560 associated with the seal member 556 that permits the seal member 556 to re-orient as required to seal with the molded article 2. The orienting seal mount 560 is disposed, at least in part, between a bottom surface 559 of the seal member 556 and the top surface 51 of the base member 52. More particularly, the orienting seal mount 560 is a grommet that has an annular body with a 'C' shaped cross-section. The shape of the grommet defines a seal member interface 561 that couples, in use, with a grommet interface 558 formed through an inner surface 563 of the seal member 556. The inner surface 563 of seal member 556 may be configured to fit loosely or tightly around the outer surface tubular pin 58. In the present non-limiting embodiment there is a gap between the inner surface 563 and the outer surface of the tubular pin 58. An inner surface of the grommet is configured to fit tightly around the outer surface of the tubular pin 58 and hence the orienting seal member 560 and the seal member 556 coupled thereto will tend to stay in a substantially fixed longitudinal position relative to the longitudinal axis of the tubular pin 58. The grommet that provides the orienting seal mount 560 may be made from a flexible material such as, for example, a rubber compound. A bottom portion of the grommet acts as a spacer between the bottom surface 559 of the seal member 556 and the top surface of the base member 51. A diameter of the bottom portion of the grommet is configured to be much narrower than the overall diameter of the seal member 556 whereby a major portion of the seal member 556 is unsupported by the orienting seal mount 560 and hence free to re-orient, by means of flexure of the seal member 556 and/or the grommet, as required to allow a sealing surface 557 of the seal member 556 to seal with the top surface 9 of the molded article 2.

Figure 8:
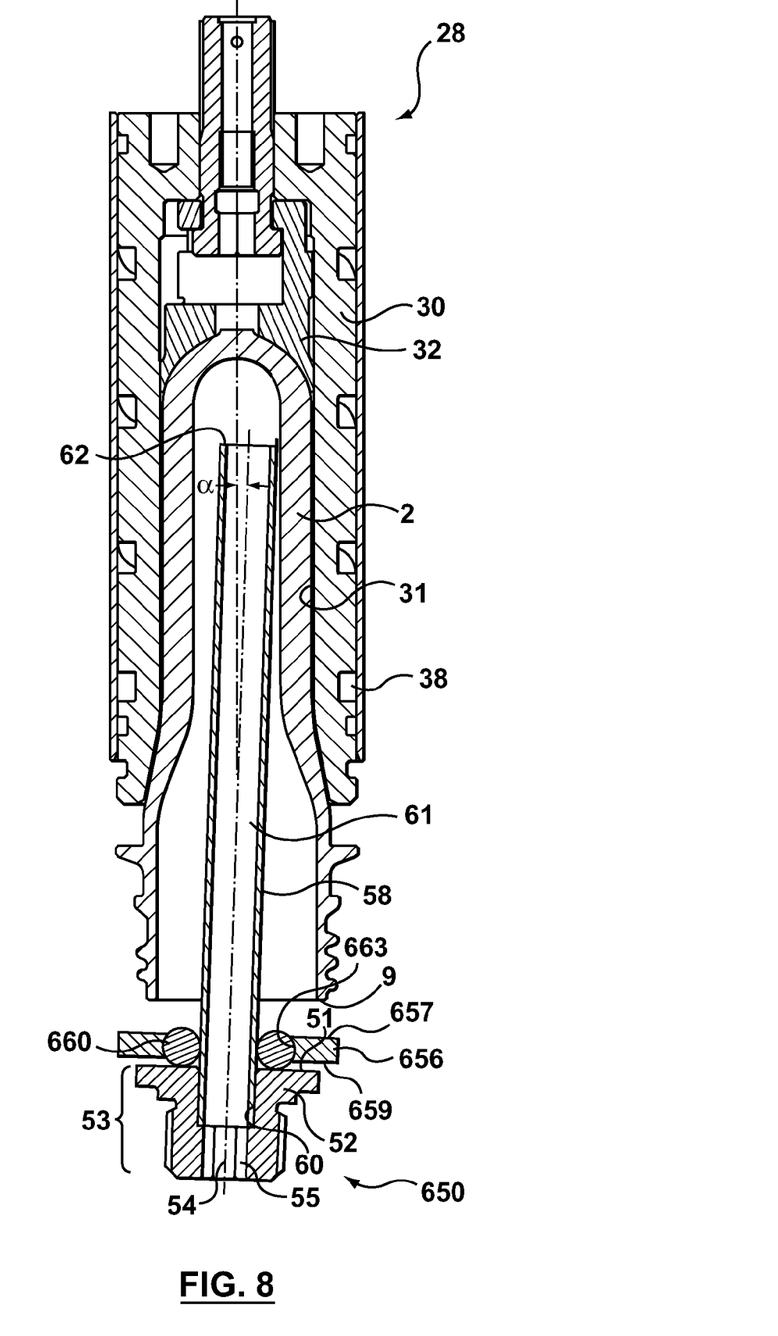
FIG. 8 depicts a section view through a molded article picker in accordance with another non-limiting embodiment of the present invention just prior to engaging a molded article in a typical molded article carrier.

With reference to FIG. 8, a molded article picker 650 in accordance with a further non-limiting embodiment of the present invention is shown. The molded article picker 650 includes the same base member 52, and tubular pin 58 as the typical molded article picker 50 described previously with reference to FIG. 2. Accordingly, the base portion of the tubular pin 58 is received in the seat 60 defined in the base member 52 such that the remaining portion of the tubular pin 58 extends from a top surface 51 of the base member 52. The first pressure channel 54 is formed through the base member 52 beneath the seat 60. The first pressure channel 54 connects the second pressure channel 61 that extends through the tubular pin 58 to the second air pressure regulator (not shown) via a pressure channel (not shown) formed in the tooling 46 of the treatment device 40 (FIG. 1). In operation, the second air pressure regulator (not shown) is controllably operated to provide the suction air flow from the region surrounding the tubular pin 58 through the top opening 62 of the second pressure channel 61. The base member 52 further includes a mounting interface 53 that is configured to cooperate with a complementary mounting interface (not shown) configured in the tooling plate 46 (FIG. 1) for releasably securing the molded article picker 650 thereto. To assist with engaging or disengaging the mounting interface 53 of the base member 52 with the complementary mounting interface (not shown) of the tooling plate 46 (FIG. 1), a tooling interface 55, such as for a hexagonal shaped key, is formed in the surface of the first pressure channel 54. The features of the mounting interface 53 may include a threaded portion and an alignment portion. The molded article picker 650 also includes a seal member 656 that has an annular body. The seal member 656 may be made from a flexible material such as, for example, silicone rubber or a relatively rigid material such as, for example, an Acetal-based polymeric compound such as DELRIN or ultra high molecular weight polyethylene. The molded article picker 650 further includes an orienting seal mount 660 associated with the seal member 656 that permits the seal member 656 to re-orient as required to seal with the molded article 2. The orienting seal mount 660 is disposed between an inner surface 663 of the seal member 656 and the outer surface of the tubular member 58. More particularly, the orienting seal mount 660 is an o-ring that is selected to have a cross-sectional diameter that is wider than the thickness of the seal member 656. The inner surface 663 of the seal member 656 has a complementary shape to the o-ring so as to couple therewith portions of the o-ring projecting above and below a sealing surface 657 and a bottom surface 659 of the seal member 656, respectively. Accordingly, when the o-ring is resting on the top surface of the base member 52 a gap is provided between the bottom surface 659 of the seal member 656 and the top surface 51 of the base member 52. The o-ring is also selected to fit tightly around the outer surface of the tubular pin 58 and hence the orienting seal member 660 and the seal member 656 coupled thereto will tend to stay in a substantially fixed longitudinal position relative to the longitudinal axis of the tubular pin 58. The o-ring that provides the orienting seal mount 660 may be made from a flexible material such as, for example, a rubber compound. Accordingly, the bottom surface 659 of the seal member 556 is unsupported by the orienting seal mount 660 and hence free to re-orient, by means of flexure of the seal member 556 and/or the o-ring, as required to allow a sealing surface 657 of the seal member 656 to seal with the top surface 9 of the molded article 2.

Figure 9:
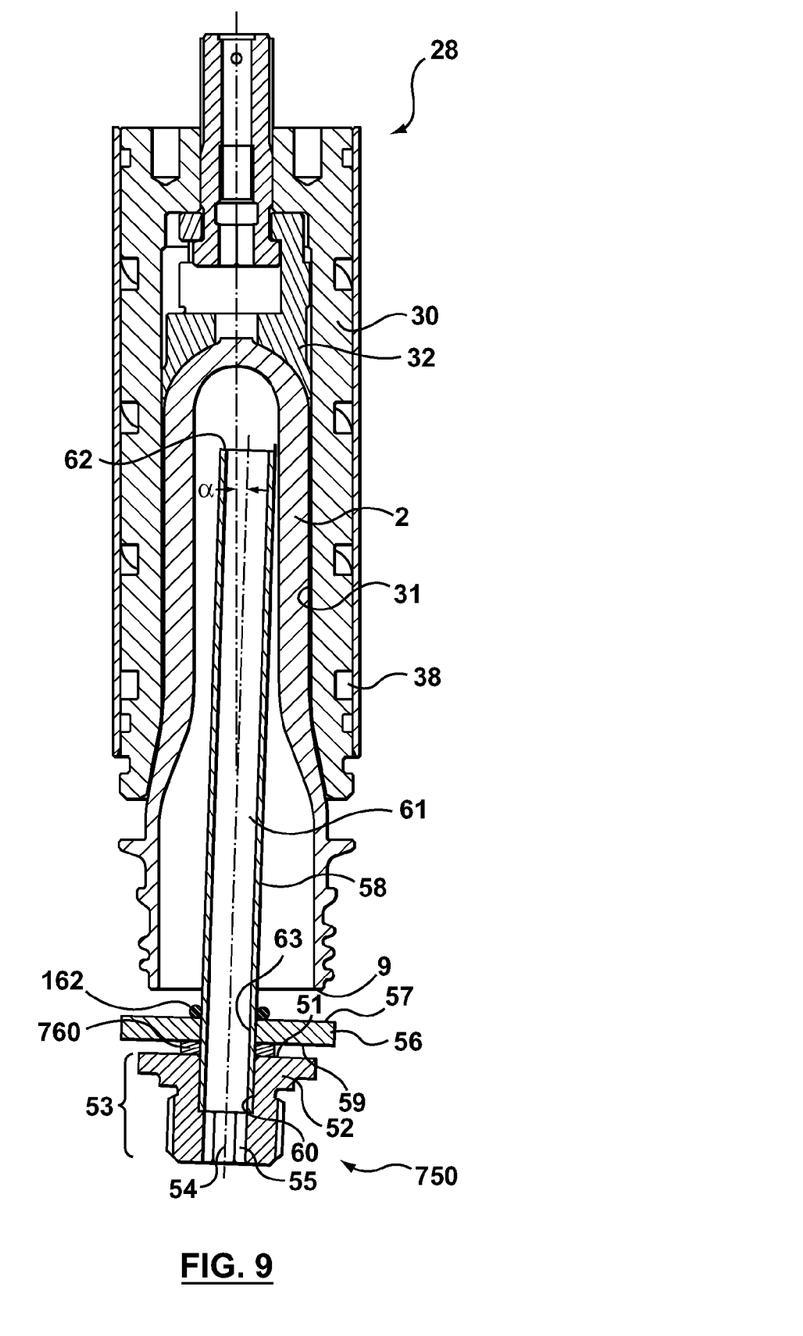
FIG. 9 depicts a section view through a molded article picker in accordance with another non-limiting embodiment of the present invention just prior to engaging a molded article in a typical molded article carrier.

With reference to FIG. 9, a molded article picker 750 in accordance with a further non-limiting embodiment of the present invention is shown. The molded article picker 750 is the same as the molded article picker 150 shown with reference to FIGS. 3A and 3B except that the molded article picker 750 includes an orienting seal mount 760 that is provided by a washer instead of the o-ring. The outer diameter of the washer is selected to be much narrower than the overall diameter of the seal member 56 whereby a major portion of the seal member 56 is unsupported by the orienting seal mount 760 and hence free to re-orient, by means of flexure, as required to allow the sealing surface 57 of the seal member 56 to seal with the top surface 9 of the molded article 2.

In operation, with a small inaccuracy in the angular positioning of the molded article picker 150, 250, 350, 450, 550, 650, or 750, into the pick position, as shown, for example, with reference to FIG. 3A at reference angle α between the centerlines of the molded article carrier 28 and the molded article picker 150, the seal member 56 is able to re-orient, as shown with reference to FIG. 3B or 4B at reference angle β between the bottom surface 59 of the seal member 56 and the top surface 51 of the base member 52, with an applied pressure on the sealing surface 57 by the top surface of the molded article 2 as the molded article 2 is ejected from the molded article carrier 28.

A technical effect, amongst others, of the aspects of the present invention may include that it is possible to completely enclose a volume between the molded article 2, the tubular pin 58, and the seal member 56 to effect a reliable vacuum assisted transfer of the molded article 2 from the molded article carrier 28 to the molded article picker 150.

The description of the embodiments of the present inventions provides examples of the present invention, and these examples do not limit the scope of the present invention. It is to be expressly understood that the scope of the present invention is limited by the claims only. The concepts described above may be adapted for specific conditions and/or functions, and may be further extended to a variety of other applications that are within the scope of the present invention. Having thus described the embodiments of the present invention, it will be apparent that modifications and enhancements are possible without departing from the concepts as described. Therefore, what is to be protected by way of letters patent are limited only by the scope of the following claims:

The invention claimed is:

1. A molded article picker for use in a treatment device in a molding system, the molded article picker comprising:
   an orienting seal mount associated with a seal member that permits the seal member to re-orient as required to seal with a molded article;
   a base member; and
   a tubular pin;
   a base portion of the tubular pin is received in a seat defined in the base member and a remaining portion of the tubular pin extends from a top surface of the base member;
   the seal member having an annular body that fits around the tubular pin;
   the orienting seal mount being disposed between the seal member and the base member;
   the orienting seal mount having a diameter which is narrower than that of the seal member whereby a major portion of the seal member is unsupported by the orienting seal mount.

2. The molded article picker of claim 1, wherein:
   the seal member has an inner surface that is configured to fit loosely around the tubular pin.

3. The molded article picker of claim 1, wherein:
   the seal member has an inner surface that is configured to fit tightly around the tubular pin.

4. The molded article picker of claim 1, wherein:
   the base member further includes a mounting interface that is configured to cooperate with a complementary mounting interface configured in a tooling plate of the treatment device for releasably securing the molded article picker thereto.

5. The molded article picker of claim 1, wherein:
   a first pressure channel is formed through the base member beneath the seat for connecting a second pressure channel that extends through the tubular pin to a pressure channel formed in a tooling plate of the treatment device.

6. The molded article picker of claim 1, wherein:
   a seal retainer is provided to maintain the seal member in a substantially fixed longitudinal position relative to a longitudinal axis of the tubular pin.

7. The molded article picker of claim 6, wherein:
   the orienting seal mount and the seal retainer are each an o-ring.

8. The molded article picker of claim 7, wherein:
   the o-ring that makes up the seal retainer is configured to fit tightly around the tubular pin and overlap a minor portion of a sealing surface of the seal member to maintain the seal member in contact with the o-ring that provides the orienting seal mount.

9. The molded article picker of claim 7, wherein:
   the o-ring that provides the orienting seal mount is configured to overlap a minor portion of a bottom surface of the seal member and a minor portion of the top surface of the base member.

10. The molded article picker of claim 1, wherein:
    the orienting seal mount includes a spherical upper surface that provides a ball interface, and the seal member includes a spherical recess that provides a socket interface, the ball interface and the socket interface being configured to cooperate as a ball joint that allows for a re-orientation of the seal member.

11. The molded article picker of claim 10, wherein:
    a seal retainer is provided to maintain the seal member in a substantially fixed longitudinal position relative to a longitudinal axis of the tubular pin with the socket interface of the seal member in contact with the ball interface of the orienting seal mount.

12. The molded article picker of claim 1, wherein:
    the orienting seal mount is formed as a part of the seal member as an annular projection from a bottom surface thereof such that the major portion of the seal member is unsupported by the orienting seal mount.

13. The molded article picker of claim 1, wherein:
    the orienting seal mount is formed as a part of the base member as an annular projection from the top surface of the base member such that the major portion of the seal member is unsupported by the orienting seal mount.

14. The molded article picker of claim 1, wherein:
    the orienting seal mount is a grommet, a shape of the grommet defines a seal member interface that couples, in use, with a grommet interface formed through an inner surface of the seal member, the grommet configured such that the major portion of the seal member is unsupported by the orienting seal mount.

15. The molded article picker of claim 1, wherein:
    the orienting seal mount is an o-ring that is selected to have a cross-sectional diameter that is wider than a thickness of the seal member, and an inner surface of the seal member has a complementary shape to the o-ring so as to couple therewith a portion of the o-ring projecting above and below a sealing surface and a bottom surface of the seal member, respectively, such that the major portion of the seal member is unsupported by the orienting seal mount.

16. The molded article picker of claim 1, wherein:
    the orienting seal mount is provided by a washer, the washer configured such that the major portion of the seal member is unsupported by the orienting seal mount.

17. A treatment device including the molded article picker of any one of claim 1, 2, 3, 4, 5, or 6 to 16.

18. A molding system including the treatment device of claim 17.